United States Patent [19]

Kordulla et al.

[11] Patent Number: 4,632,502

[45] Date of Patent: Dec. 30, 1986

[54] DRIVE SYSTEM FOR AN OSCILLATING MIRROR MOVABLE ABOUT AN AXIS OF OSCILLATION IN OPTICAL INSTRUMENTS

[75] Inventors: Hans Kordulla, Singen; Reiner Eckhardt, Überlingen, both of Fed. Rep. of Germany

[73] Assignee: Bodenseewerk Geratetchnik GmbH, Überlingen, Fed. Rep. of Germany

[21] Appl. No.: 542,689

[22] Filed: Oct. 17, 1983

[30] Foreign Application Priority Data

Jan. 17, 1983 [DE] Fed. Rep. of Germany ....... 3301274

[51] Int. Cl.$^4$ ............................................. G02B 26/10
[52] U.S. Cl. ................................................... 350/6.6
[58] Field of Search ............................. 350/6.6; 310/36

[56] References Cited

U.S. PATENT DOCUMENTS

| | | | |
|---|---|---|---|
| 3,102,744 | 9/1963 | Reuter et al. | 287/87 |
| 4,158,845 | 6/1979 | Pinson | 343/759 |
| 4,295,621 | 10/1981 | Siryj | 248/183 |

FOREIGN PATENT DOCUMENTS

| | | |
|---|---|---|
| 2523047 | 12/1975 | Fed. Rep. of Germany . |
| 2841777 | 3/1980 | Fed. Rep. of Germany . |
| 2032266 | 11/1970 | France . |
| 2139972 | 1/1973 | France . |
| 2097148 | 10/1982 | United Kingdom . |

OTHER PUBLICATIONS

"Instruments and Experimental Techniques", vol. 15, No. 5, Sep./Oct. 1972, pp. 1522-1523.

Primary Examiner—John K. Corbin
Assistant Examiner—Rebecca D. Gass
Attorney, Agent, or Firm—Lee, Smith & Zickert

[57] ABSTRACT

A nutating coupler arrangement is provided for driving an oscillating mirror movable about an axis of oscillation 12. A driving member 18, which rotates about a driving axis 24, is connected to the oscillating mirror through a coupler 28. The driving axis 24 is offset relative to the plane 34 perpendicular to the axis of oscillation 12 and extending through the pivotal point 30 of the coupler 28 at the oscillating mirror. The coupler 28 makes a nutating motion while the pivotal point 30 makes an oscillating motion.

5 Claims, 3 Drawing Figures

DRIVE SYSTEM FOR AN OSCILLATING MIRROR MOVABLE ABOUT AN AXIS OF OSCILLATION IN OPTICAL INSTRUMENTS

The invention relates to a drive system for an oscillating mirror movable about an axis of oscillation in optical instruments.

In optical instruments, for example in seeker heads, oscillating mirrors are used for periodically deflecting an optical path of rays. In this way a field of view can be scanned in a seeker head. But also a spectrum can be scanned in a spectrometer.

It is the object of the invention to provide a compact and space-saving drive system for an oscillating mirror in optical instruments.

According to the invention this object is achieved by
 (a) a driving member which rotates about a driving axis, and
 (b) a coupler between the driving member and the oscillating mirror, which coupler
  (b$_1$) at one end is pivoted at the oscillating mirror outside the axis of oscillation through an universally movable joint, and
  (b$_2$) at the other end is pivoted at the driving member outside the driving axis through a universally movable joint,
  the driving axis extending outside the plane which is perpendicular to the axis of oscillation and extends through the pivotal point of the coupler at the oscillating mirror.

Modifications of the invention are subject matter of the sub-claims.

An embodiment of the invention will now be described in greater detail with reference to the accompanying drawings.

Figure 1:
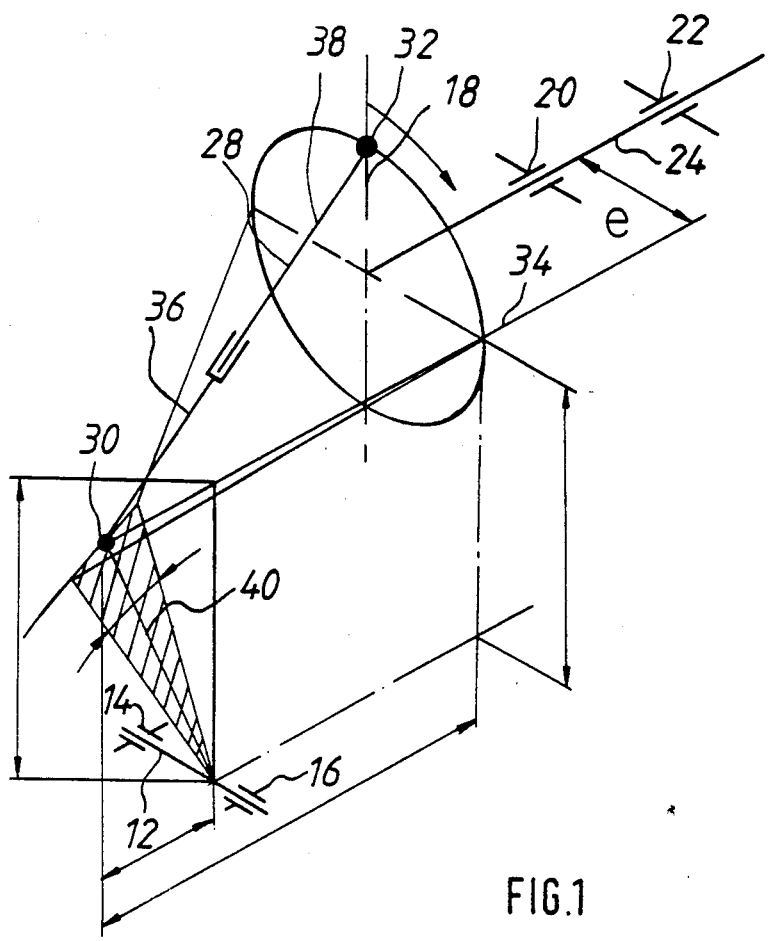
FIG. 1 shows schematically-perspectively a drive system for an oscillating mirror movable about an axis of oscillation in optical instruments in the different positions.

An oscillating mirror 10, which is not illustrated in FIG. 1, is movably mounted about an axis of oscillation by means of bearings 14,16. A driving member 18 is rotatably mounted in bearings 20,22 about a driving axis 24 and is driven by a motor not illustrated. The driving member 18 is connected to the oscillating mirror 10 through a coupler 28. The coupler 28 is at one end pivoted at the oscillating mirror 10 outside the axis of oscillation 12 through an universally movable joint 30. At the other end the coupler 28 is pivoted at the driving member 18 outside the driving axis 24 through a universally movable joint 32. The driving axis 24 extends perpendicularly to a plane containing the axis of oscillation 12 without intersecting the axis of oscillation 12. Therein the driving axis 24 is offset by a distance e relative to the plane 34 perpendicular to the axis of oscillation 12 and extending through the pivotal point 30 of the coupler 28 at the oscillating mirror 10.

Figure 2:
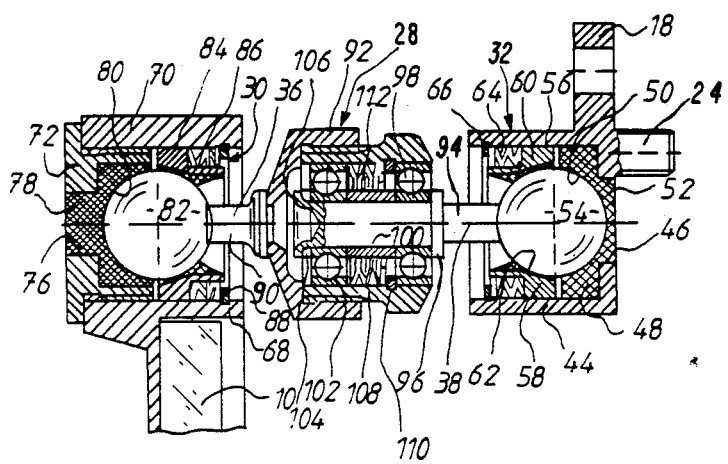
FIG. 2 shows a longitudinal sectional view of a preferred embodiment of such a drive system.

The driving axis 24 can extend within an angular range of ±20° about the normal of the mirror plane in the central position of the oscillating mirror 10. The coupler 28 consists of two portions 36 and 38 rotatable one relative to the other about the longitudinal axis of the coupler 28, of which portions one is pivoted at the oscillating mirror 10 and the other one is pivoted at the driving member 18. The universally movable joints 30 and 32 are formed as ball-and-socket joints, as illustrated in FIG. 2. In this way the ball-and-socket joints 30 and 32 take up only the reciprocating swivelling movements, while the continuous rotational movement about the longitudinal axis of the coupler 28 is enabled by the two portions 36 and 38 being rotatable.

The oscillating mirror 10 oscillates about a central position 40. In the preferred embodiment the driving axis 24 is perpendicular to the mirror plane in the central position of the oscillating mirror 10. The oscillating mirror 10 is a portion of an imaging optical system (not illustrated) with folded path of rays, which system defines an optical axis. The driving axis 24 extends parallel to this optical axis.

The driving axis 24 can extend within an angular range of ±20° to the optical axis.

Figure 3:
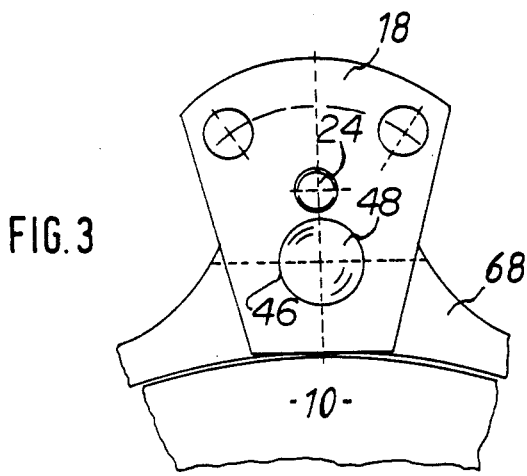
FIG. 3 is a view seen from the right in FIG. 2.

FIGS. 2 and 3 show a constructive embodiment of the driving system.

The driving member 18 is a disc which is connected with an axis to a driving motor (not illustrated).. The disc forms a housing 44 on one side, which housing 44 projects toward the left in the figure and is open toward the left. On the bottom of the housing 44 on the right in the figure, an aperture 46 is provided in the disc. A cup 48 of dry bearing material with a concave-spherical bearing surface 50 is located in the housing 44. The cup 48 extends with a projection 52 into the aperture 46. A precision ball welded on by electron-beam welding on the portion 38 of the coupler 28 is located as a joint ball 54 in the cup 48. A second, annular cup 56 having a metal ring 58 and a bearing portion 60 with a concave-spherical bearing surface 62 is pushed over the portion 38 and engages the joint ball 54 on the side opposite the cup 48. The cup 56 is pressed on on the joint ball 54 by an ondular washer 64. The ondular washer 64 is supported on a snap ring 66 which is snapped into the inner surface of the housing 44.

A cylindric housing 70 is formed at a mirror frame 68, in which the oscillating mirror 10 is supported. A ring 72 with a stepped aperture 76 is screwed into the housing 70 from the left in the figure. A cup 78 of dry bearing material having an outer surface complementary to the aperture 76 and a concave-spherical bearing surface 80 is located in the aperture 76. A joint ball 82 is located in the bearing surface 80 from the right, which joint ball 82 also is formed by a precision ball which is welded on by electron-beam welding on the portion 36 of the coupler 28. Furthermore an annular cup 84 is inserted into the housing 70 from the right in the figure. The cup 84 is constructed similarly to the cup 56. It is pressed against the joint ball 82 by an ondular washer 86. The ondular washer 86 is supported on a snap ring 88 which is snapped into a groove in the inner surface of the housing 70.

The portion 36 of the coupler 28 comprises a pin 90 which carries the joint ball 82 at one end and merges into a bell-shaped portion 92 at the other end. The bell-shaped portion 92 is internally threaded. The portion 38 of the coupler 28 comprises a pin 94 with a collar 96. The pin 94 carries the joint ball 54 at the right end in the figure. A first ball bearing 98 is pushed on the pin 94 from the other, left end, which ball bearing 98 with its inner ring engages the collar. Then a spacer sleeve 100 and a second ball bearing 102 is located on the pin 94. The inner ring of the second ball bearing 102 is held by a ring 104 and a bead 106 of the left end of the pin 94. A sleeve 108 is pushed over the outer rings of both ball bearings 98, 102. A snap ring 110 snaps into the inner surface of the sleeve 108 and engages the left end, as viewed in the figure, of the outer ring of the ball bearing 98. An ondular washer 112 is supported on the ring 110, which ondular washer 112 surrounds the distance sleeve 100 and engages the outer ring of the ball bearing 102. In this manner the ondular washer 112 tends to axially press apart the outer rings of both ball bearings 98 and 102. Thereby the two ball bearings 98 and 102 are biassed. The sleeve 108 is externally threaded and screwed therewith into the internal thread of the bell-shaped portion 92.

The maximal oscillation amplitude $\phi_o$ results when the offset of the driving axis 24 relative to the plane 34 perpendicular to the axis of oscillation 12 and extending through the pivotal point 30 of the coupler 28 at the oscillating mirror 10 is equal to the eccentricity e of the pivotal point 32 of the coupler 28 at the driving member 18 with respect to the driving axis 24. This case is illustrated in FIG. 1.

A drive system is obtained, in which the driving axis 24 can be arranged essentially perpendicular to the plane of the oscillating mirror 10 and parallel to the optical axis of an optical image system with a path of rays folded on the the optical axis. The described mechanism operates without bearing clearance. The drive system is insensitive to housing vibrations. A compact and space-saving construction is obtained. The demand of energy for the drive system can be kept small.

Instead of the slidingly mounted ball-and-socket joints illustrated in FIG. 2, also ball bearing mounted joints can be provided, which not only permit the swivelling movements but also the continuous rotational movements of the coupler 28 about the longitudinal axis. Then the ball bearings 98 and 102 in FIG. 2 with the corresponding structure can be omitted.

We claim:

1. Drive system for an oscillating mirror movable about an axis of oscillation in optical instruments characterized by
   (a) a driving member which rotates about a driving axis and means for rotating said driving member, and
   (b) a coupler between the driving member and the oscillating mirror, which coupler
      (b$_1$) at one end is pivoted at the oscillating mirror outside the axis of oscillation through an universally movable joint,
      (b$_2$) at the other end is pivoted at the driving member outside the driving axis through a universally movable joint;
      (b$_3$) consists of two portions rotatable one relative to the other about the longitudinal axis of the coupler, of which portions one is pivoted at the oscillating mirror and the other one is pivoted at the driving member, and
      (b$_4$) in which the universally movable joints are formed as ball-and-socket joints,
   the driving axis extending outside the plane which is perpendicular to the axis of oscillation and extends through the pivotal point of the coupler at the oscillating mirror.

2. Drive system as set forth in claim 1, characterized in that the driving axis extends perpendicularly to a plane containing the axis of oscillation without intersecting the axis of oscillation.

3. Drive system as set forth in claim 2, characterized in that the offset of the driving axis (24) relative to the plane (34) perpendicular to the axis of oscillation (12) and extending through the pivotal point (30) of the coupler (28) at the oscillating mirror (10) is equal to the eccentricity (e) of the pivotal point (32) of the coupler (28) at the driving member (18) with respect to the driving axis (24).

4. Drive system as set forth in claim 2, characterized in that
   (a) the oscillating mirror oscillates about a central position, and
   (b) the driving axis extends within an angular range of ±20° about the normal of the mirror plane in the central position of the oscillating mirror.

5. Drive system as set forth in claim 4, characterized in that
   (a) the oscillating mirror is part of an imaging optical system with folded path of rays, which system defines an optical axis, and
   (b) the driving axis extends within an angular range of ±20° to the optical axis.

* * * * *